United States Patent
Gupta et al.

[19]

[11] Patent Number: 5,826,258
[45] Date of Patent: Oct. 20, 1998

[54] METHOD AND APPARATUS FOR STRUCTURING THE QUERYING AND INTERPRETATION OF SEMISTRUCTURED INFORMATION

[75] Inventors: Ashish Gupta, Menlo Park; Venky Harinariyan, Mountain View; Dallan Quass, Palo Alto; Anand Rajaraman, Stanford, all of Calif.

[73] Assignee: Junglee Corporation, Sunnyvale, Calif.

[21] Appl. No.: 724,943

[22] Filed: Oct. 2, 1996

[51] Int. Cl.⁶ .................................................. G06F 17/30
[52] U.S. Cl. .................................. 707/4; 707/10; 707/104
[58] Field of Search ............................. 707/3, 4, 6, 102, 707/10, 104

[56] References Cited

U.S. PATENT DOCUMENTS

| | | | |
|---|---|---|---|
| 4,631,673 | 12/1986 | Haas et al. | 707/100 |
| 4,918,588 | 4/1990 | Barrett et al. | 707/10 |
| 4,918,593 | 4/1990 | Huber | 707/10 |
| 5,307,484 | 4/1994 | Baker et al. | 707/102 |
| 5,386,556 | 1/1995 | Hedin et al. | 707/4 |
| 5,649,186 | 7/1997 | Ferguson | 707/10 |
| 5,706,507 | 1/1998 | Schloss | 707/104 |
| 5,737,592 | 4/1998 | Ngyuen et al. | 707/4 |
| 5,748,954 | 5/1998 | Mauldin | 707/10 |
| 5,761,663 | 6/1998 | Lagarde et al. | 707/10 |

*Primary Examiner*—Thomas G. Black
*Assistant Examiner*—Charles L. Rones
*Attorney, Agent, or Firm*—Townsend and Townsend and Crew; Kenneth R. Allen; Paul A. Durdik

[57] ABSTRACT

A method is provided for determining how semistructured information is organized in disparate semistructured resources by providing a wrapper to extract information and to provide structured information (e.g., tuples of an SQL database) to a mapper coupled to a standard relational database engine. In a specific embodiment, a querying agent is provided on top of the mapper. Further according to the invention, structured high-level user queries are processed across the disparate semistructured resources using a plurality of wrappers each dedicated to a particular resource.

24 Claims, 9 Drawing Sheets

```html
<html>
<body>
<h2>Condos</h2>
<p>
<b>Palo Alto</b> 2 BR/1 BA with sunny dining area and new
carpeting.  $1200/mo.
<p>
<b>Los Altos</b> Terrific views from this end unit.  Only
$1500/mo if you respond to this ad before 9/15.
<hr>
<h2>Apartments</h2>
<p>
<b>Menlo Park</b> 3 BR/1 BA with washer/dryer hookups.  $1000.
<p>
<b>Palo Alto</b> Conveniently located in downtown Palo Alto
next to the train station.  No Pets.  1 BR/1 BA.
<hr>
</body>
```

FIG. 6

```
// Variable declarations
string: $category, $listings, $text, $city
number: $rent, $bedrooms, $bathrooms // Definition of semistructured information
URL: http://www.rentals.com/listings.html
    "<h2>" $category "</h2>" $listings #LOOKAHEAD ("<h2>" |
    "</body>")
TEXT: $listings
    "<p>" $text #LOOKAHEAD ("<p>" | "<hr>")
TEXT: $text
    "<b>" $city "</b>"
    "$" $rent
    $bedrooms "BR"
    $bathrooms "BA"
```

FIG. 8

| category | city | rent | bedrooms | bathrooms |
|---|---|---|---|---|
| Condos | Palo Alto | 1200 | 2 | 1 |
| Condos | Los Altos | 1500 | | |
| Apartments | Menlo Park | 1000 | 3 | 1 |
| Apartments | Palo Alto | | 1 | 1 |

FIG. 9

METHOD AND APPARATUS FOR STRUCTURING THE QUERYING AND INTERPRETATION OF SEMISTRUCTURED INFORMATION

BACKGROUND OF THE INVENTION

This invention relates to structured information retrieval and interpretation from disparate semistructured information resources. A particular application of the invention is extraction of information from public and semipublic databases through worldwide information sources, as facilitated by the Internet.

The Internet is a network which provides avenues for worldwide communication of information, ideas and messages. Although the Internet has been utilized by academia for decades, recently there has been almost an explosion of interest in the Internet and the information residing thereon. The World Wide Web (or "the Web") accounts for a significant part of the growth in the popularity of the Internet, perhaps because of the user-friendly graphical user interfaces ("GUIs") that are readily available for accessing the Web.

The World Wide Web makes hypertext documents available to users over the Internet. A hypertext document does not present information linearly like a book, but instead provides the reader with links or pointers to other locations so that the user may jump from one location to another. The hypertext documents on the Web are written in the Hypertext Markup Language ("HTML").

As the popularity of the World Wide Web grows, so too does the wealth of information it provides. Accordingly, there may be many sites and pages on the World Wide Web that contain information a user is seeking. However, the Web contains no built-in mechanism for searching for information of interest. Without a searching mechanism, finding sites of interest would literally be like finding a needle in a haystack. Fortunately, there exist a number of web sites with search engines (e.g., under the designations YAHOO™, ALTA VISTA™, EXCITE™, etc.) that allow users to perform relatively simple keyword searches.

Although keyword searches are adequate for many applications, they fail miserably for many other uses. For example, there are numerous web sites that include multiple entries or lists on job openings, houses for sale, and the like. Keyword searches are inadequate to search these sites for many reasons. Keyword searches invariably turn up information that, although matching the keywords, is not of interest. This problem may be alleviated somewhat by narrowing the search parameters, but this has the attendant risk of missing information of interest. Additionally, the search terms supported may not allow identification of information of interest. As an example, one may not be able to specify in a keyword search query to find job listings that require less than three years of experience in computer programming.

Ideally, it would be desirable if information like job listings on multiple web sites could appear as a single relational database so that relational database queries could be utilized to find information of interest. However, there is no standard for the structure of information like job listings on the Web. One solution would be to require each web site, whether a newspaper, company or other entity, to provide the job listing information in a defined format to create an amalgam of job listings. This may prove to be an unsatisfactory solution since the information must be continually reformatted for use by another site (e.g., a job bank site).

Another solution would be to hand-craft (i.e., custom program) wrappers to extract information from a site. The wrapper being a program or software layer that allows information on a web site (e.g., job listings) to appear like or be accessible by a relational database. Thus, the wrapper is relatively web site specific and hides the actual format of the semistructured information at the site. Hand-crafting wrappers has the disadvantages that it is very tedious and time-consuming, which will probably result in both a high cost to add sites and lengthy delays in making the new sites available. Additionally, hand-crafted wrappers would be difficult to maintain in order to take into account changes in the web site.

SUMMARY OF THE INVENTION

The present invention provides systems and methods for determining how semistructured information is organized in disparate semistructured resources and generating a wrapper to extract information and to provide structured information (e.g., tuples of a structured query language or SQL database) to a mapper coupled to a standard relational database engine. In a specific embodiment, a querying agent is provided on top of the mapper. Further according to the invention, structured high-level user queries are processed across the disparate semistructured resources using a plurality of wrappers each dedicated to a particular information source.

In one embodiment, the invention provides a method of generating a wrapper for accessing semistructured information, comprising the steps of: examining the semistructured information to identify patterns of interest that include attributes; generating a description file including regular expressions for the patterns which specify locations of the attributes within the semistructured information; and utilizing the description file to generate a wrapper which provides access to the attributes in the semistructured information as tuples for a relational database system. The wrapper may be automatically generated from the description file by a compiler or interpreter. In preferred embodiments, the semistructured information is in HTML representing a web page at a web site.

Advantages of the invention include providing the capability to integrate information from literally thousands of web sites, making them available as a single, unified, relational database. In effect, the Web becomes a virtual relational database on which a user may perform Structured Query Language ("SQL") queries. Additionally, the invention allows this capability to be achieved and expanded in a significantly fast manner, while allowing easy accommodation for changes in accessed web sites.

The invention will be better understood upon reference to the following detailed description in connection with the accompanying drawings.

BRIEF DESCRIPTION OF THE DRAWINGS

FIG. 6 shows a sample HTML page of a web site;

FIG. 8 shows a description file that may be generated to map the HTML page of FIG. 6;

FIG. 9 shows the tuples which a wrapper generated from the description file of FIG. 7 made available to a relational database system;

DETAILED DESCRIPTION OF SPECIFIC EMBODIMENTS

Definitions

Semistructured information — information that as a whole does not have a precise structure, however, elements within the semistructured information have meanings based on their location or surroundings within the semistructured information. The format of semistructured information may be represented by regular expressions, typically nested regular expressions.

Site — location or object including related, interconnected collection of blocks of text, forms, and the like. For example, a web site may present text as semistructured information in the form of a web page.

Agent — component visible to a user. For example, an agent may include a user interface that accepts a user's relational database query and displays the results of the query.

Wrapper (or site program) — software layer that provides a relational database interface to information on a site.

Mapper — component responsible for translating the different site vocabularies into one that an agent understands. Mappers generally reside between agents and wrappers, providing a level of insulation between the two.

DETAILED DESCRIPTION

In the description that follows, the present invention will be described in reference to a preferred embodiment that operates on the World Wide Web. In particular, examples will be described which illustrate particular applications of the invention on the Web. The present invention, however, is not limited to any particular information source nor limited by the examples described herein. Therefore, the description the embodiments that follow is for purposes of illustration and not limitation.

Figure 1:
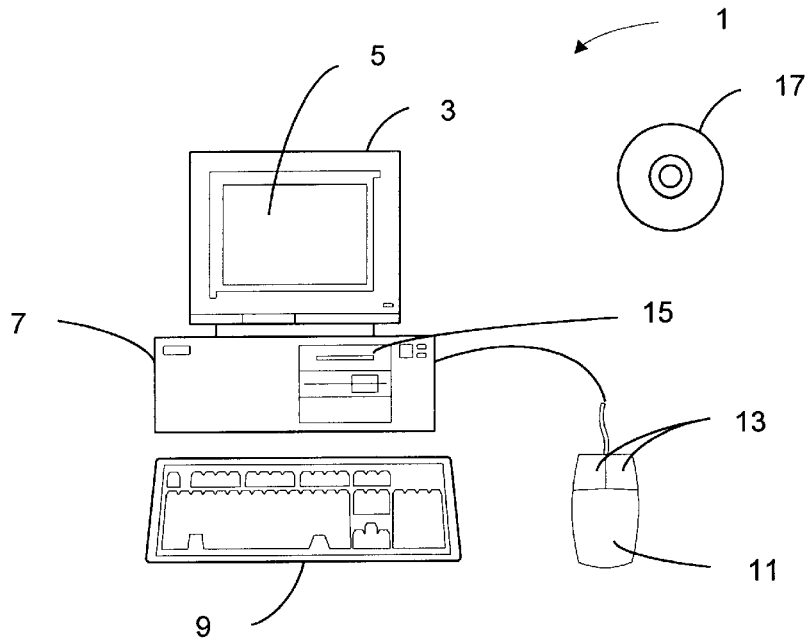
FIG. 1 illustrates an example of a computer system used to execute the software of an embodiment of the present invention.

FIG. 1 illustrates an example of a computer system used to execute the software of an embodiment of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15, a system memory and a hard drive (see FIG. 2) which may be utilized to store and retrieve software programs incorporating code that implements the present invention, data for use with the present invention, and the like. Although a CD-ROM 17 is shown as an exemplary computer readable storage medium, other computer readable storage media including floppy disks, tape, flash memory, system memory, and hard drives may be utilized. Cabinet 7 also houses familiar computer components (not shown) such as a central processor, system memory, hard disk, and the like.

Figure 2:
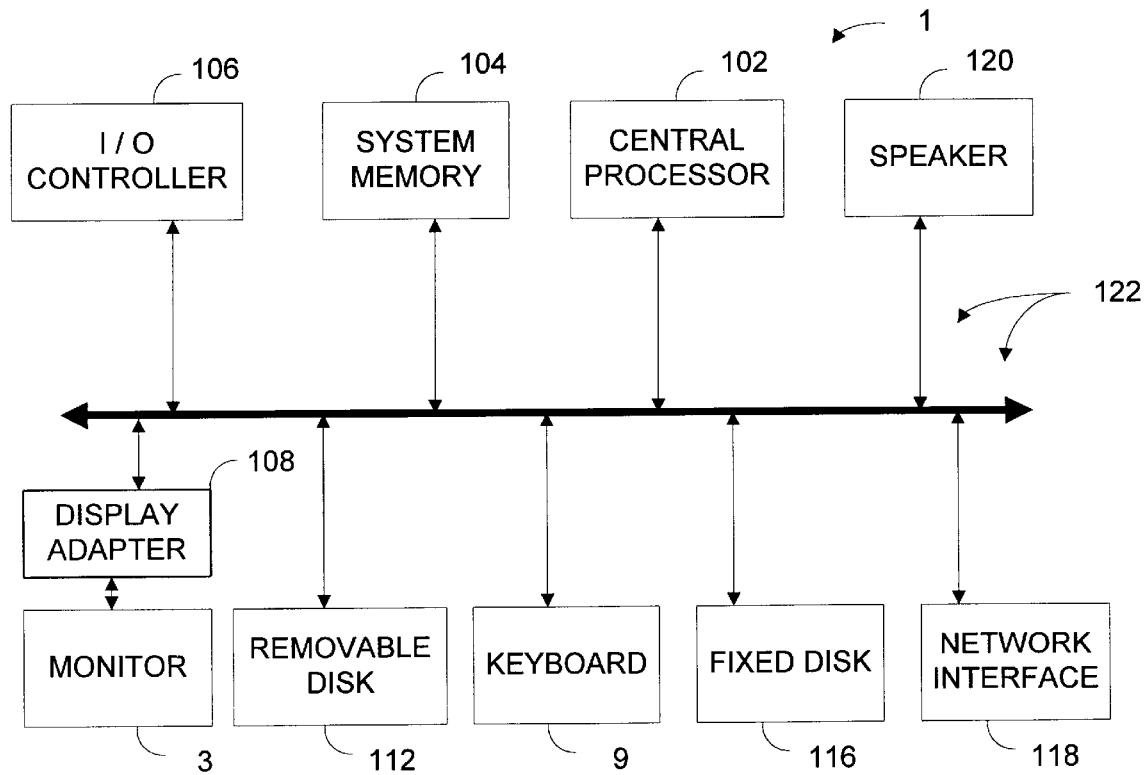
FIG. 2 shows a system block diagram of a typical computer system used to execute the software of an embodiment of the present invention.

FIG. 2 shows a system block diagram of computer system 1 used to execute the software of an embodiment of the present invention. As in FIG. 1, computer system 1 includes monitor 3 and keyboard 9. Computer system 1 further includes subsystems such as a central processor 102, system memory 104, I/O controller 106, display adapter 108, removable disk 112 (e.g., CD-ROM drive), fixed disk 116 (e.g., hard drive), network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the present invention. Other configurations of subsystems suitable for use with the present invention will be readily apparent to one of ordinary skill in the art.

Figure 3:
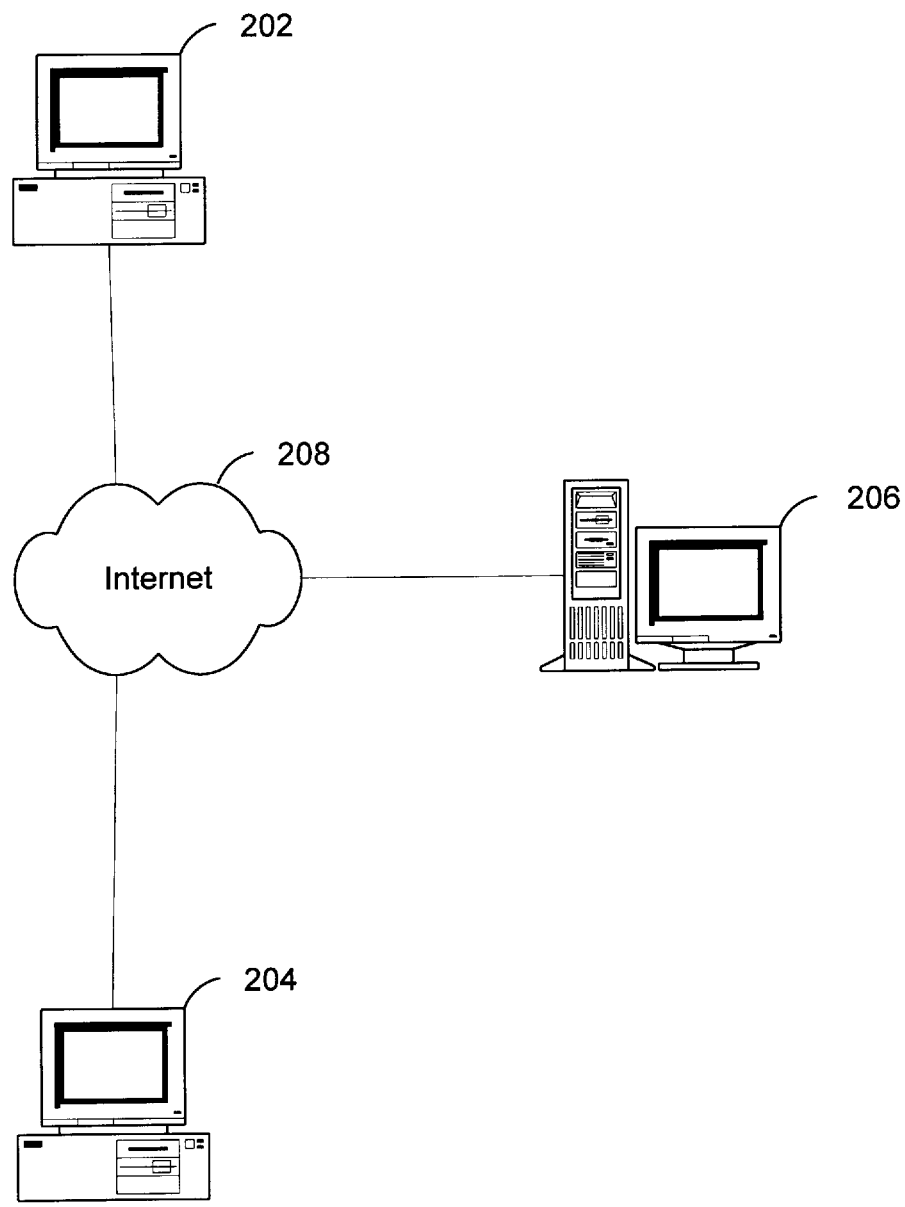
FIG. 3 shows a diagram of multiple computers networked over the Internet.

A preferred embodiment of the invention provides access to semistructured information (e.g., web pages) on web sites on the Internet. FIG. 3 shows a diagram of multiple computers networked over the Internet. Computers 202, 204 and 206 are interconnected by the Internet 208, which is a series of high-speed communications links between educational, research and commercial computer sites around the world. Internet computers use the Transmission Control Protocol/ Internet Protocol ("TCP/IP") as the communications protocol.

Figure 4:
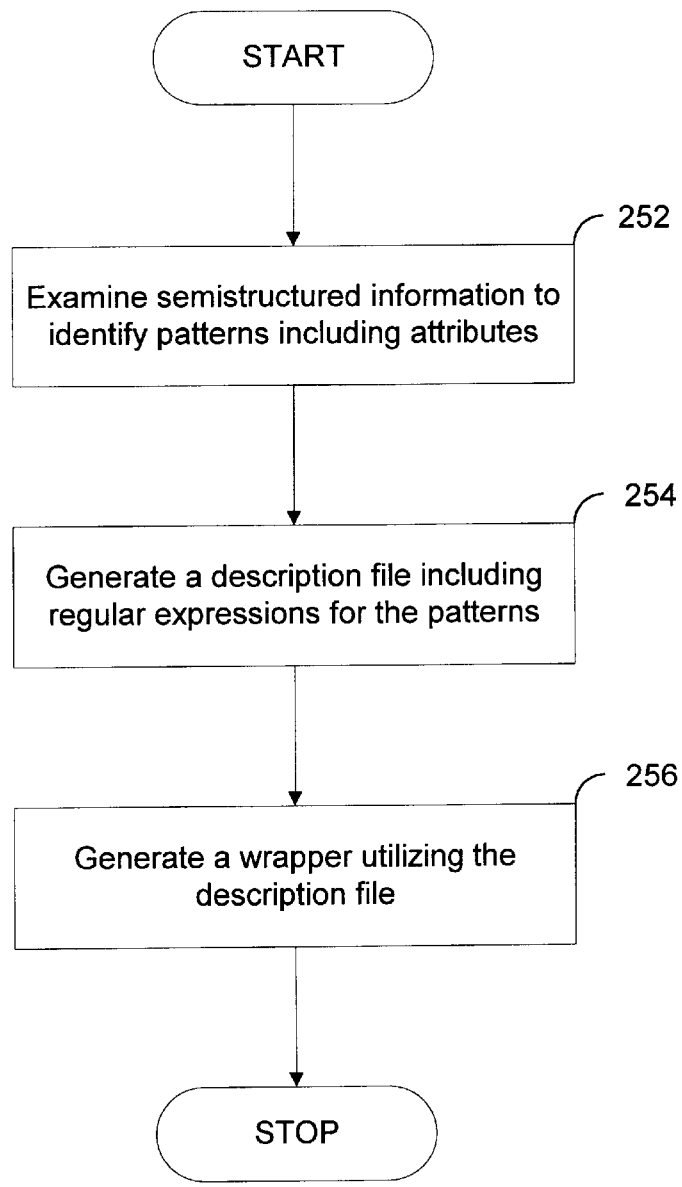
FIG. 4. is a high level flowchart of a process of generating a wrapper.

FIG. 4. is a high level flowchart of a process of generating a wrapper. At step 252, semistructured information is examined (e.g., using lexical analysis) to identify patterns of interest within the semistructured information that include attributes. Attributes are typically one or more words in the text of the semistructured information. For example, the words "Palo Alto" may be an attribute of interest within semistructured information that will later be associated with a "city" field in a relational database schema. Attributes may also be processed to yield additional semistructured information. Thus, an attribute may be a link to a web page, or the argument to a function that outputs a string of information. In preferred embodiments, the semistructured information are in HTML representing a web page.

A description file is generated which includes regular expressions for the patterns at step 254. The description file includes regular expressions that act as a map to the attributes within the semistructured information. The description file is typically stored on a computer readable storage medium like a hard drive or memory. Although steps 252 and 254 are typically performed by a user, the steps may also be automated so that they are performed by a programmed computer system.

At step 256, a wrapper is generated utilizing the description file. The wrapper provides access to the attributes in the semistructured information as tuples for a relational database system. The wrapper may be generated by compiling the description file or using the description file as input to an interpreter.

As will be described in more detail below, once the wrapper for specific semistructured information is generated, a user may generate a relational database query (e.g., SQL query) which is satisfied by tuples provided by the wrapper. The wrapper extracts the attributes of interest from the semistructured information and the tuples may be provided to the relational database system. Accordingly, the relational database system views the semistructured information as one or more database tables as a result of the wrapper.

Of course, the preceding example is a very simple embodiment of the invention intended to aid the reader's understanding. Typically, there will be multiple wrappers corresponding to different semistructured information. Additionally, there may be one or more mappers to translate attributes within semistructured information accessed by a wrapper to fields in the relational database schema.

Figure 5:
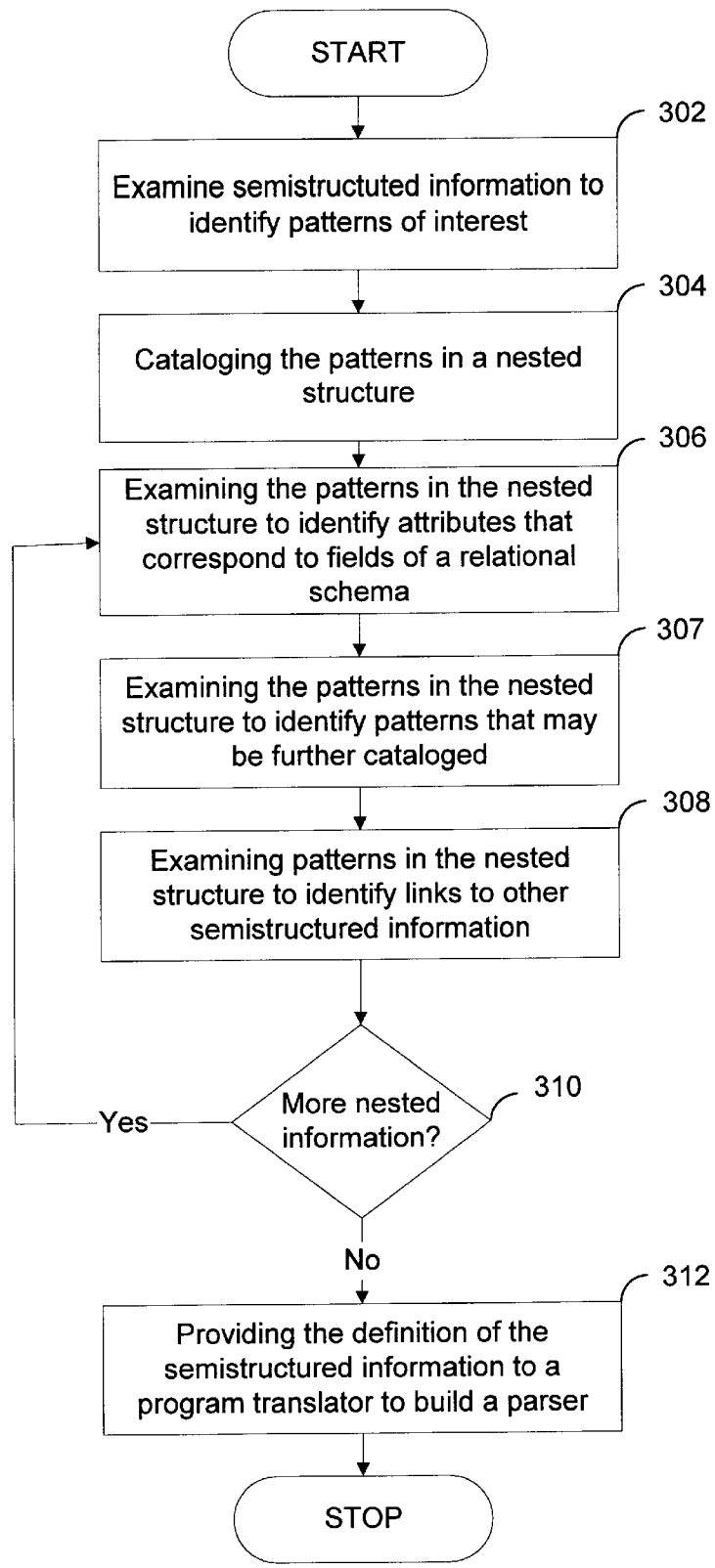
FIG. 5 is a flowchart of a process of generating a wrapper for accessing semistructured information.

FIG. 5 is a flowchart of a process of generating a wrapper for accessing semistructured information from disparate semistructured information sources. At step 302, the semistructured information is examined for repetitive patterns of interest by using lexical analysis. The repetitive patterns of interest include one or more attributes.

At step 304, the occurrences of the patterns in the semistructured information are cataloged by name and position in a nested structure without a priori information. By cataloging without a priori information, it is meant that there is no requirement that a user have prior knowledge or perform any prior programming before the patterns are cataloged. In one embodiment, the nested structure is a graph representing the nestedness of the attributes within the semistructured information. Typically, many of the attributes of the nested structure correspond to fields of a relational database schema.

The patterns in the nested structure is examined to identify attributes that correspond to fields of a relational database schema at step 306. After these attributes are identified, regular expressions are generated that specify the location of the attributes within the semistructured information. The regular expressions may be generated as soon as these attributes are identified or when the definition of the semistructured information is written to a file. Thus, the generation of the regular expressions need not be performed at any specific time.

At step 307, the patterns in the nested structure are examined to identify patterns that may be further cataloged. Some patterns of interest may be further broken down into other patterns of interest. Each one of these patterns that is identified is decomposed into its constituent smaller patterns. These smaller patterns are then cataloged in the nested structure for further examination.

The patterns in the nested structure are examined to identify links to other semistructured information at step 308. The links point to other semistructured information that may include patterns of interest and attributes. The links are followed and the other semistructured information is examined for patterns of interest which are then cataloged in the nested structure. Typically, the links are Uniform Resource Locator ("URL") addresses of web pages. However, the links may also point to a program which, when executed, will generate semistructured information output which is then examined.

It is then determined if there is more nested information to examine at step 310. If there is more nested information, the nested information in the nested structure is examined to identify attributes that correspond to fields in the relational database schema at step 306. Although steps 306, 307 and 308 are shown in a particular order, it is not required that these steps, like many other steps in the flowcharts, be performed in the order shown. Thus, the order shown in the flowcharts is to illustrate one embodiment and not to limit the invention.

Otherwise, if there is not more nested information to examine, the definition of the semistructured information is provided or input to a program translator to build a parser at step 312. The definition of the semistructured information includes regular expressions including attributes corresponding to fields of the relational database schema. The regular expressions specify locations of the attributes within the semistructured information that correspond to the relational database schema. Thus, the wrapper will include the parser that is capable of parsing the semistructured information for attributes so the wrapper can present the attributes to a relational database system as tuples. The program translator may be a compiler or interpreter.

In one embodiment, a compiler generates a parser by receiving the definition file as input and generating a program (i.e., the parser) for extracting attributes from the semistructured information that correspond to fields of the relational database schema to form tuples. In another embodiment, an interpreter generates a parser by receiving the definition of the semistructured information and the semistructured information as input, and extracting attributes from the semistructured information that correspond to fields of the relational schema to form tuples At this point it may be helpful to go over an example. FIG. 6 shows a sample HTML page of a web site that includes multiple real estate rentals. With a little bit of effort, it can be seen that two condos and two apartments available for rent are described in the web site. Although this web site is very simple, it provides a good example of a kind of semistructured information that is accessible through a relational database with the present invention.

The HTML page is scanned for repetitive patterns of interest which include attributes. These repetitive patterns of interest are identified and cataloged in a graph or nested structure shown in FIG. 7. Root node 402 is an indication of the URL address for the web site. Below the root node are other nodes which indicate patterns of interest within the web site of FIG. 6. Node 403 indicates that the web site includes a Category Block. As indicated by nodes 404 and 406, the Category Block includes one or more repetitions of an attribute "category" followed by a Listing Block. The attribute "category" is the type of rental (e.g., Condos or Apartments).

The Listing Block includes one or more attributes "text" as indicated by node 408. The "text" attribute is the text of the listing for a rental unit. As shown, the text may include possibly the attributes "city," "rent," "bedrooms," and "bedrooms" as indicated by nodes 410, 412, 414, and 416, respectively. Thus, the graph indicates the location of attributes within the web site. This graph may be utilized to generate a description file including regular expressions as follows.

FIG. 8 shows a description file that may be generated to map the HTML page of FIG. 6. Initially, the description file has variable definitions. Thus, variables $category, $listings, $text, and $city are strings (i.e., one or more characters). Also, variables $rent, $bedrooms and $bathrooms are numbers. These variables correspond to attributes of interest in the web site and also to each nonroot node in the graph for the web site Following the variable definitions is the definition of the semistructured information or web site. As shown the web site address is of type "URL." The web site itself is defined by the regular expression as follows:

"<h2>" $category "</h2>" $listings #LOOKAHEAD ("<h2>" | "</body>") This regular expression means that the variable $category, which corresponds to attribute "category," will be found between the HTML tags <h2> and </h2>. As an example, line 3 of the HTML page in FIG. 6 shows "Condos" between these tags.

The above regular expression also indicates that after the HTML tag </h2>, the variable $listings may be found and it continues until either the tag <h2> or </body> is reached. The variable $listings corresponds to the Listing Block in FIG. 406. The keyword "#LOOKAHEAD" indicates that these tags should be searched for to delimit the variable $listings but that these tags should remain for further parsing. The web page is shown to contain four repetitions of semistructured information that match this regular expression, one for each rental listing.

Referring still to FIG. 8, the variable $listings is of type "TEXT" (which is a data type that should not be confused with the attribute "text" or the variable $text) and is represented by the following regular expression:

"<p>" $text #LOOKAHEAD ("<p>" | "<hr>")

This regular expression indicates that the variable $listings includes a variable $text (which corresponds to attribute "text") between the tag <p> and either of the tags <p> or <hr>.

The variable $text is of type "TEXT" and is represented by the following regular expressions:

"<b>" $city "</b>"

"$" $rent $bedrooms "BR"

$bathrooms "BA"

These regular expressions indicate that the variable $text may include none to all of the variables $city, $rent, $bedrooms, and $bathrooms. These variables correspond to attributes "city," "rent," "bedrooms," and "bathrooms," respectively. As indicated by the regular expression, the variable $city will be between the tags <b> and </b>. The variable $rent will follow the dollar sign. Also, the variables $bedrooms and $bathrooms will precede the words "BR" and "BA," respectively. Although the example shows only a single HTML page as the source of the data, the data source may in general be an information repository, possibly with links between different pieces of information.

The description file may be utilized by a dedicated program translator to generate a wrapper. As described, the description file includes a set of regular expressions, and for each regular expression its name (implicit), position in the nested structure, and corresponding attributes of the nested structure. The wrapper makes the attributes available to a relational database system as tuples.

Figure 7:
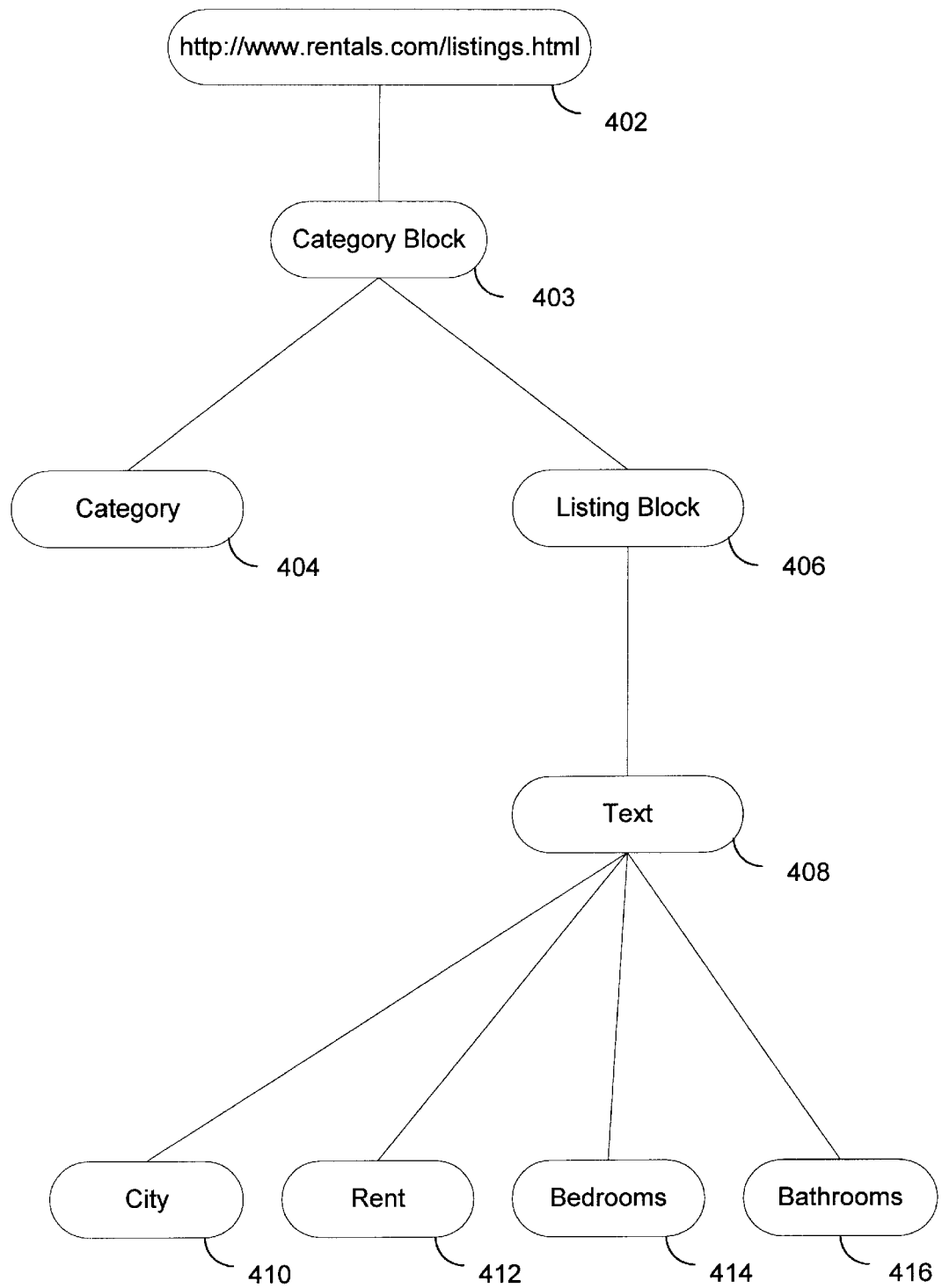
FIG. 7 is a graph including attributes of interest for the HTML page of FIG. 6.

FIG. 9 shows the tuples which a wrapper generated from the description file of FIG. 7 made available to a common relational database system. For simplicity, the five attributes correspond directly to five fields of the relational database. However, in practice, the attributes may need to be translated by a mapper. For example, the mapper may need to associate the attribute "category" with a field named "rental—type." Additionally, the mapper may need to convert the rent from a monthly figure to a yearly figure. The translation performed by a mapper may also utilize a relational database.

As shown, the wrapper makes four tuples available to a relational database system. Two of the tuples describe condos and two of the tuples describe apartments. Fields are blank where the information was not present in the web site. In some instances, a single grouping of attributes may result in more than one relational tuple.

With these tuples being made available to a user through a relational database system, the user may perform queries that are not available with keyword searches. For example, the user may ask for all rentals that are less than $1100 per month. Additionally, the semistructured information from the web site is made available for a relational database. Accordingly, this information may be combined with other relational information. Thus, assume that there is a web site that has information on cities such as name, population, median income, median house price, and the like. With the present invention a wrapper may be utilized to make that semistructured information available so that a user may ask for all rentals that are less than $1100 per month and in a city with less than 65,000 people. As is standard in relational database systems, the city field would be utilized to link this information together to fulfill the query.

The attribute "text" in node 408 of FIG. 7 is not shown in the tuples of FIG. 9. This illustrates that not all attributes in the semistructured information have to correspond to a field of a relational database schema. Of course, all the attributes may be made available so that the relational database uses the ones that it needs.

Although the preceding example utilizes relational data from two web sites, it should be readily apparent that the invention will allow hundreds or thousands of web sites to appear as a virtual relational database to the user. Also, this virtual relational database may be combined with other relational databases that are stored on a local computer system or reside remotely on another networked computer system. Thus, the information on cites above could have been located in a relational database stored locally on the computer system.

Figure 10:
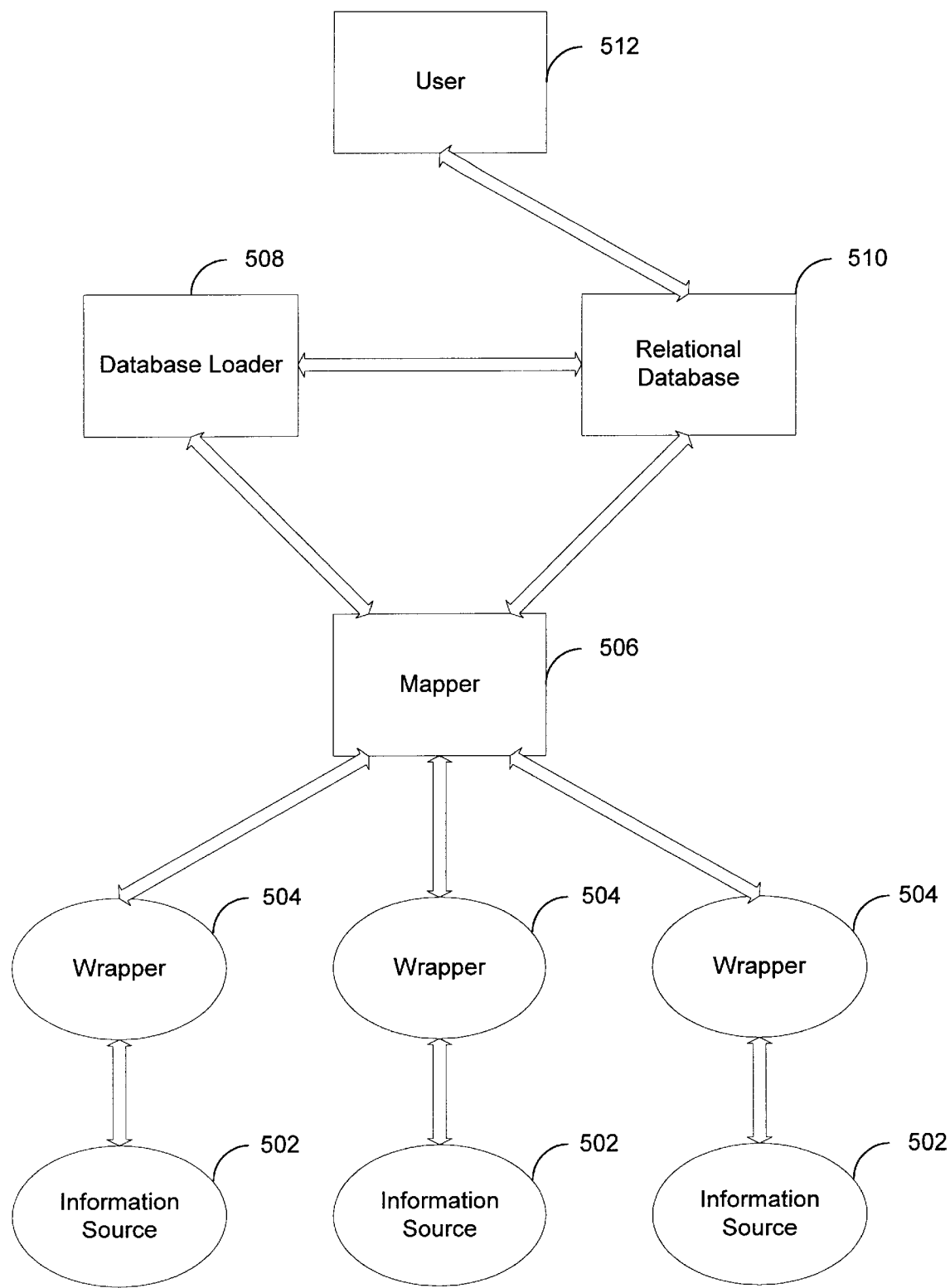
FIG. 10 shows a block diagram of one embodiment of the invention which utilizes a database loader for data-warehousing.

FIG. 10 shows a block diagram of one embodiment of the invention which utilizes a database loader for data-warehousing. Multiple information sources 502 (e.g., web sites that form a hypertext network) are accessed through multiple wrappers or site programs 504. The tuples provided by the wrappers are translated through a single mapper 506 to match the schema (or field names) of the relational database system. Although a single mapper is shown, multiple mappers may be utilized (e.g., one mapper for each wrapper).

In data-warehousing, a database loader 508 retrieves all the data of interest from the information sources and loads it into a relational database 510. Thus, when a user 512 submits a query, the user's query is not satisfied by going out over the Web and accessing multiple web sites because the data is preloaded into relational database 510. Accordingly, the user's query is satisfied by the relational database. This has the obvious advantage that it is significantly faster than satisfying the query in real-time over the Web.

In order to implement data-warehousing, it is useful to know all the possible attributes of interest. For example, if the database loader did not know that "Palo Alto" was a city, in some circumstances the tuples that the database loader would preload into the relational database would not include "Palo Alto" in the city field. Although this would not be the case for the web page shown in FIG. 6 (as the city is always surrounded by the tags <h2> and </h2>), it may be the case for some web sites where the city is not always so easily identifiable.

Figure 11:
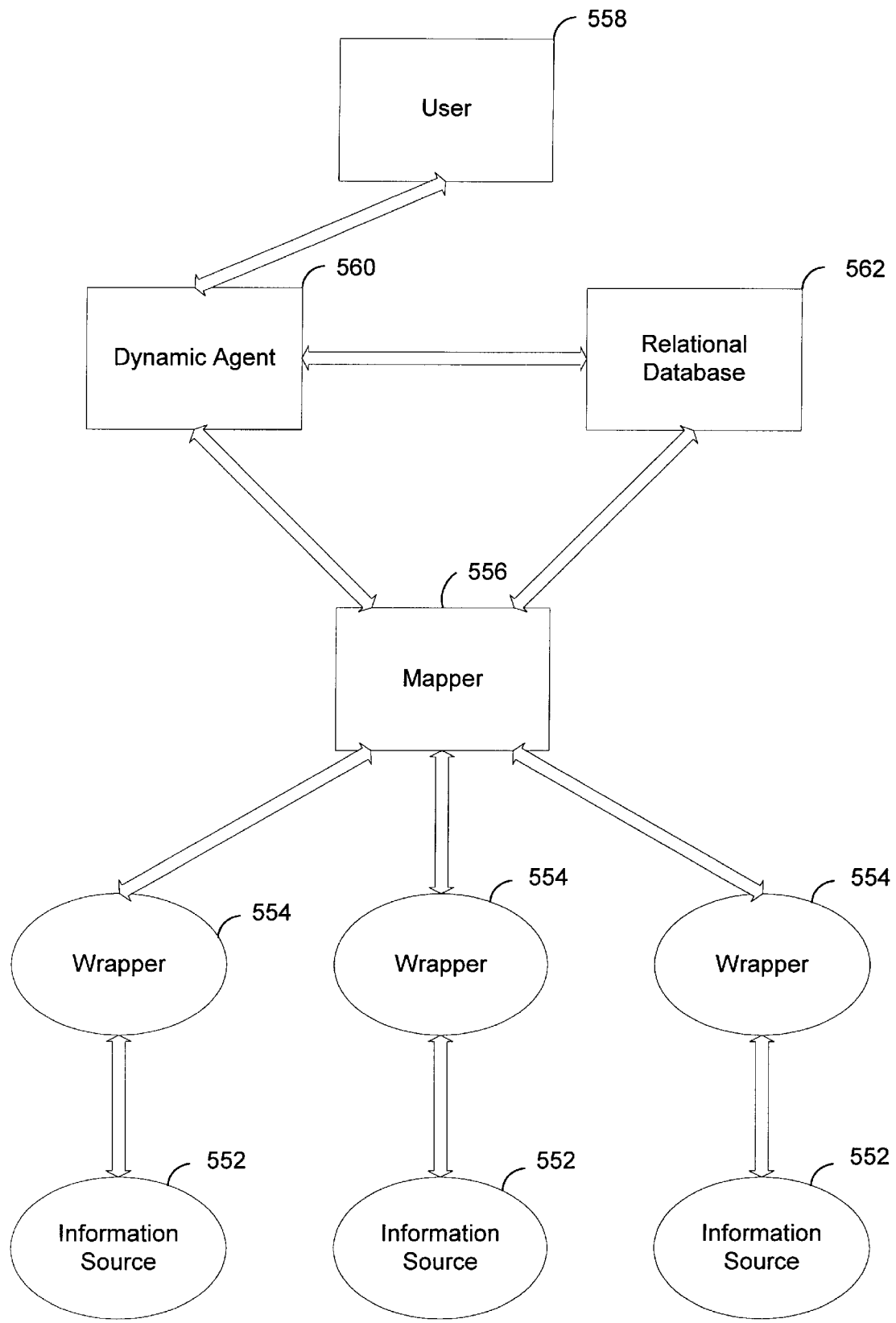
FIG. 11 shows a block diagram of another embodiment of the invention which utilizes a dynamic agent.

FIG. 11 shows a block diagram of another embodiment of the invention which utilizes a dynamic agent. Multiple information sources 552 are accessed through multiple wrappers 554. The tuples provided by the wrappers are translated through a mapper 556 to match the schema of the relational database system. In contrast to FIG. 11, a user 558 queries a dynamic agent 560. As the dynamic agent accesses information from the information sources, the resulting data is stored or cached in a relational database 562. The relational database may also contain other relational data in conjunction with the relational data from the information sources.

When the dynamic agent receives a query from a user, the agent determines whether there is sufficient data already in the relational database to satisfy the query. Additionally, the agent may determine if the data in the relational database is sufficiently current (e.g., using timestamps). If additional data or information is needed, the agent issues a query to the mapper, which in turn issues queries to the appropriate information sources through the wrappers.

Although this approach may not always be as fast as the data-warehousing approach, it has the advantage that it is not required that the full range of attributes be know beforehand. For example, once a user submits a query that includes "city = Palo Alto," the dynamic agent knows that "Palo Alto" is a city and can search the information sources accordingly. In other embodiments, a hybrid of these two approaches are utilized such that some data is preloaded into the relational database while other data is retrieved in real-time. These hybrid approaches may provide the advantages of both approaches.

The invention has now been explained with reference to specific embodiments. Other embodiments will be apparent to one of ordinary skill in the art. It is therefore not intended that this invention be limited, except as indicated by the appended claims.

What is claimed is:

1. A method of generating a wrapper for accessing semistructured information in order to provide access to at least one of a plurality of attributes in said semistructured information as tuples for a relational database system, said method comprising the steps of:

examining the semistructured information to identify patterns of interest, said patterns of interest including at least one of said attributes;

generating a description file, including regular expressions, for the patterns of interest, said regular expressions specifying at least one of a plurality of locations of the attributes within the semistructured information; and generating said wrapper based upon the description file.

2. The method of claim 1, wherein the examining step comprises the step of repeatedly examining the semistructured information for nested patterns of interest.

3. The method of claim 1, further comprising the step of cataloging, without a priori information, the patterns of interest by name and position in a nested structure.

4. The method of claim 1, further comprising the steps of:

examining a plurality of other semistructured information to identify patterns of interest that include attributes;

generating a plurality of description files including regular expressions for the patterns which specify locations of the attributes within each semistructured information; and generating a plurality of wrappers based upon the plurality of description files in order to provide access to the attributes in the plurality of other semistructured information as tuples for the relational database system.

5. The method of claim 1, wherein the semistructured information is in Hypertext Markup Language representing a World Wide Web page.

6. The method of claim 1, wherein the wrapper is generated by a compiler that compiles the description file to produce the wrapper.

7. The method of claim 1, wherein the wrapper is generated as an interpreter that receives the description file as input.

8. The method of claim 1, further comprising the step of utilizing a mapper to translate attributes within the semistructured information accessed by the wrapper to fields in the relational database system.

9. A method for generating a parser for parsing semistructured information, said parsing to produce an input to a relational database by structuring, querying and interpreting said semistructured information to form at least one of a plurality of organized tuples, said method comprising the steps of:

a) lexically analyzing the semistructured information to identify patterns of interest;

b) cataloging, without a priori information, the patterns of interest, said cataloging further comprising:

associating a name and a position with each pattern of interest;

providing a nested structure;

incorporating each pattern of interest along with said name and said position into said nested structure;

c) examining the patterns of interest in the nested structure to identify attributes that correspond to fields of a relational schema of a relational database;

d) further examining the patterns of interest in the nested structure to identify embedded patterns of interest upon which to apply the cataloging step;

e) yet further examining the patterns of interest in the nested structure to identify links to other semistructured information sources to examine; thereupon, applying the lexically analyzing, cataloging, examining, further examining and yet further examining steps to said other semistructured information sources;

f) forming a plurality of regular expressions of the semistructured information in the nested structure;

g) providing said plurality of regular expressions in a definition for use by a dedicated program translator; and h) providing the definition as input to the program translator for building said parser for the relational database.

10. The method according to claim 9, wherein the dedicated program translator is a compiler, and wherein building the parser comprises the steps of:

receiving the definition of the semistructured information as input; and generating a program for extracting attributes from the semistructured information that correspond to fields of the relational schema to form tuples.

11. The method according to claim 9, wherein the dedicated program translator is an interpreter, and wherein building the parser comprises the steps of:

receiving the definition of the semistructured information and the semistructured information as input; and extracting attributes from the semistructured information that correspond to fields of the relational schema to form tuples.

12. The method according to claim 9, wherein the semistructured information is produced by multiple computer programs as output.

13. A method for responding to a single high-level structured user query over a plurality of disparate semistructured information resources, comprising the steps of:

providing a wrapper for each one of the disparate semistructured information resources, each wrapper employing a definition of semistructured information for a specific semistructured information resource, each wrapper created by:

examining the semistructured information to identify patterns of interest, said patterns of interest including at least one of said attributes;

generating a description file, including regular expressions, for the patterns of interest, said regular expressions specifying at least one of a plurality of locations of the attributes within the semistructured information; and generating said wrapper based upon the description file; thereupon issuing the user query through the wrappers to the plurality of disparate semistructured information resources;

receiving tuples from each one of the wrappers in response to the query;

providing the tuples to a relational database; and executing the query on the relational database to return results to the user.

14. The method according to claim 13, wherein the providing step further comprises:

translating, via a mapper, the tuples to a schema and vocabulary of the common relational database.

15. The method according to claim 13, wherein the user query is an SQL query.

16. The method according to claim 13, wherein the semistructured information resources are built in a hypertext network.

17. A method for responding to a single high-level structured user query over a plurality of disparate semistructured information resources, comprising the steps of:

providing a wrapper for each one of the disparate semistructured information resources, each wrapper employing a definition of semistructured information for a specific semistructured information resource, each wrapper created by:

examining the semistructured information to identify patterns of interest, said patterns of interest including at least one of said attributes;

generating a description file, including regular expressions, for the patterns of interest, said regular expressions specifying at least one of a plurality of locations of the attributes within the semistructured information; and generating said wrapper based upon the description file; thereupon;

issuing a preselected set of load queries through the wrappers to the plurality of disparate semistructured information resources to collect tuples;

receiving the tuples from each one of the wrappers in response to the query;

storing the tuples in a common relational database; and executing the single user query on the common relational database to return results to the user.

18. A method of generating a wrapper for accessing information in a web page, comprising the steps of:

examining the web page to identify patterns of interest that include attributes;

generating a description file including regular expressions for the patterns of interest which specify locations of the attributes within the web page; and generating a wrapper based upon the description file said wrapper, providing access to the attributes in the web page as tuples for a relational database system.

19. The method of claim 18, wherein the examining step comprises the step of repeatedly examining the semistructured information for nested patterns of interest.

20. The method of claim 18, further comprising the step of cataloging, without a priori information, the patterns of interest by name and position in a nested structure.

21. The method of claim 18, further comprising the steps of:

examining a plurality of other web pages to identify patterns of interest that include attributes;

generating a plurality of description files including regular expressions for the patterns which specify locations of the attributes within each web page; and generating a plurality of wrappers based upon the plurality of description files said plurality of wrappers to provide access to the attributes in the plurality of other web pages as tuples for the relational database system.

22. The method of claim 18, wherein the wrapper is generated by a compiler that compiles the description file to produce the wrapper.

23. The method of claim 18, wherein the wrapper is generated as an interpreter that receives the description file as input.

24. The method of claim 18, further comprising the step of utilizing a mapper to translate attributes within the semistructured information accessed by the wrapper to fields in the relational database system.

\* \* \* \* \*